March 2, 1948.  H. L. EKIN ET AL  2,436,959
VEHICLE TRANSPORTING MEANS
Filed June 17, 1946  3 Sheets-Sheet 1
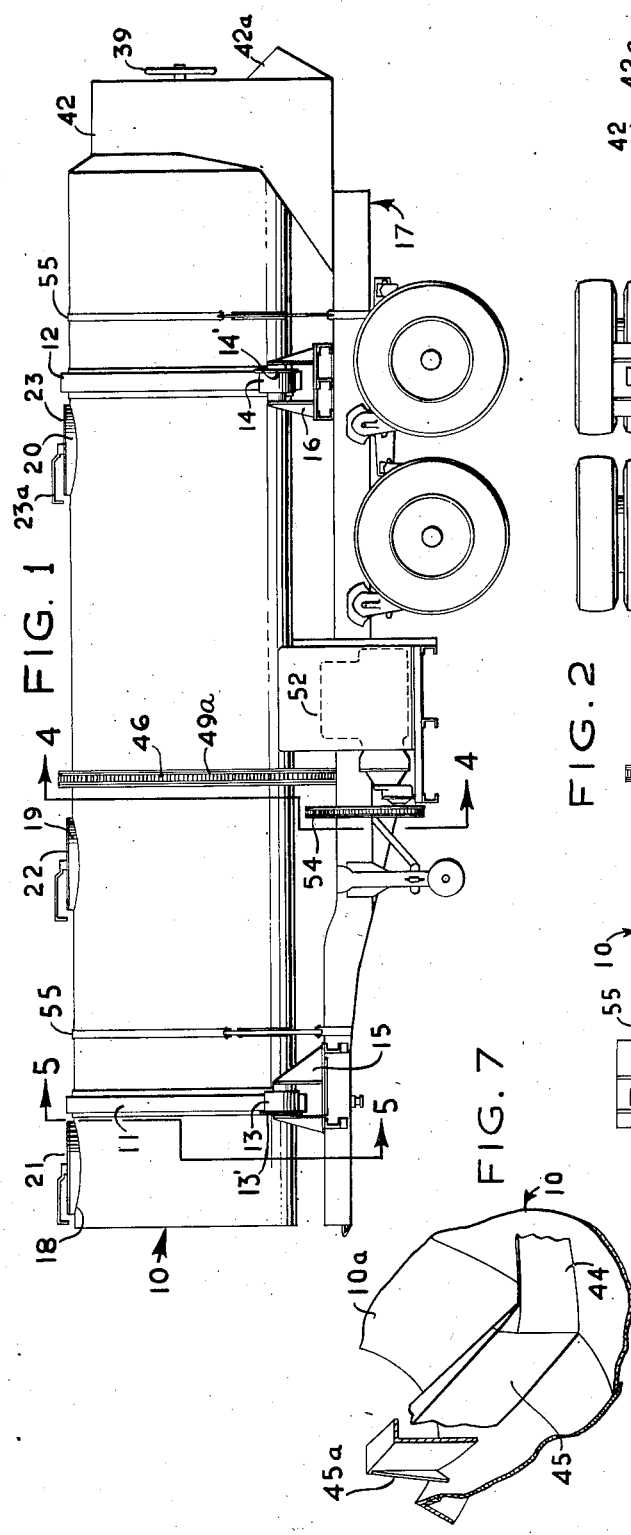
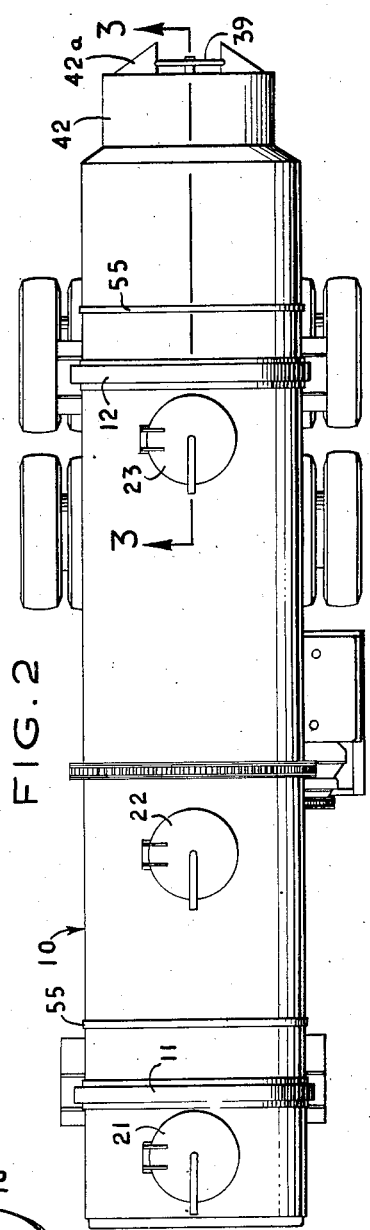
INVENTORS
HURSEL L. EKIN
JOSEPH O. YOUNG
BY
Toulmin & Toulmin
ATTORNEYS March 2, 1948.  H. L. EKIN ET AL  2,436,959
VEHICLE TRANSPORTING MEANS
Filed June 17, 1946  3 Sheets-Sheet 2
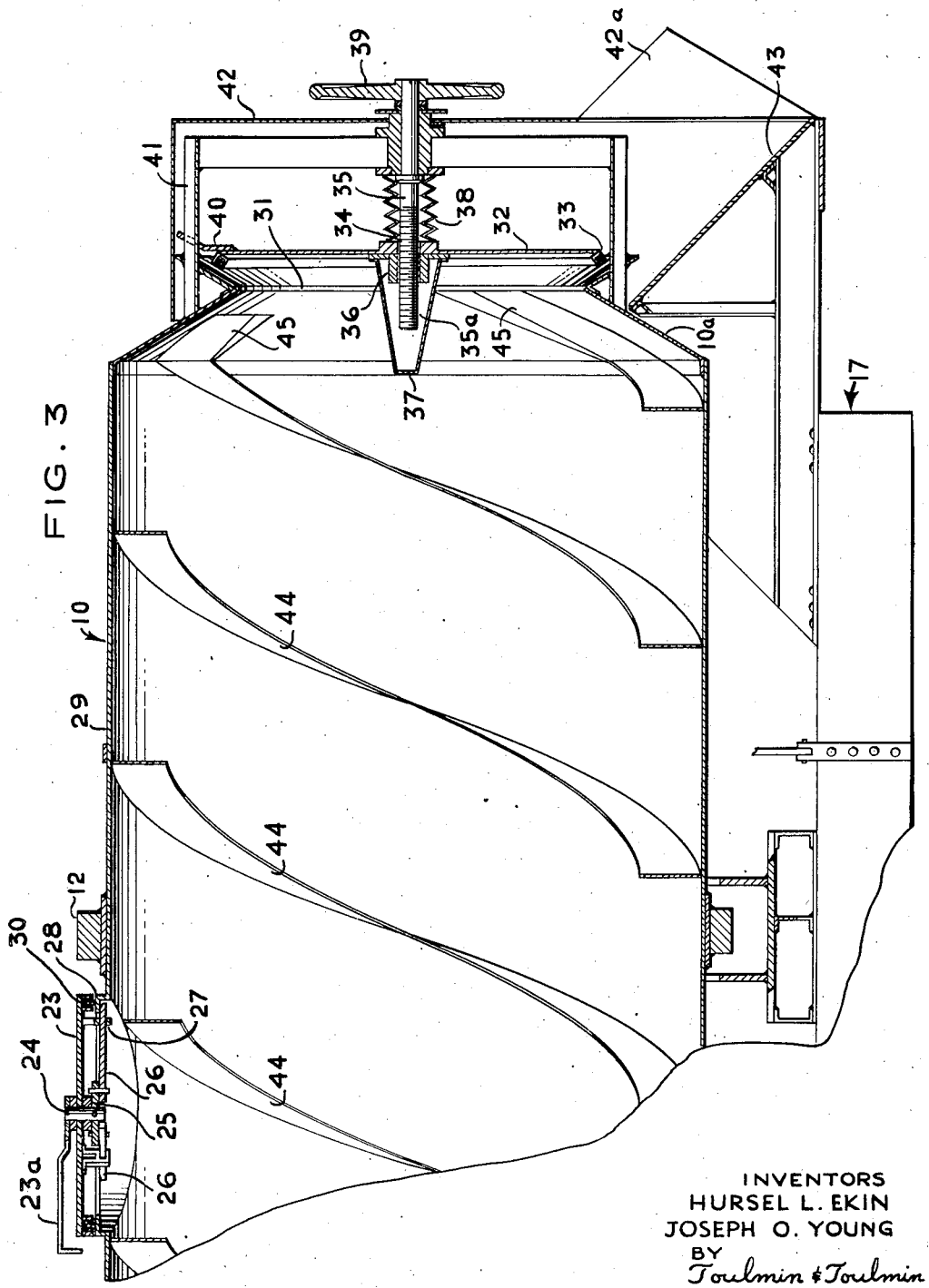
INVENTORS
HURSEL L. EKIN
JOSEPH O. YOUNG
BY
Toulmin & Toulmin
ATTORNEYS March 2, 1948.  H. L. EKIN ET AL  2,436,959
VEHICLE TRANSPORTING MEANS
Filed June 17, 1946  3 Sheets-Sheet 3
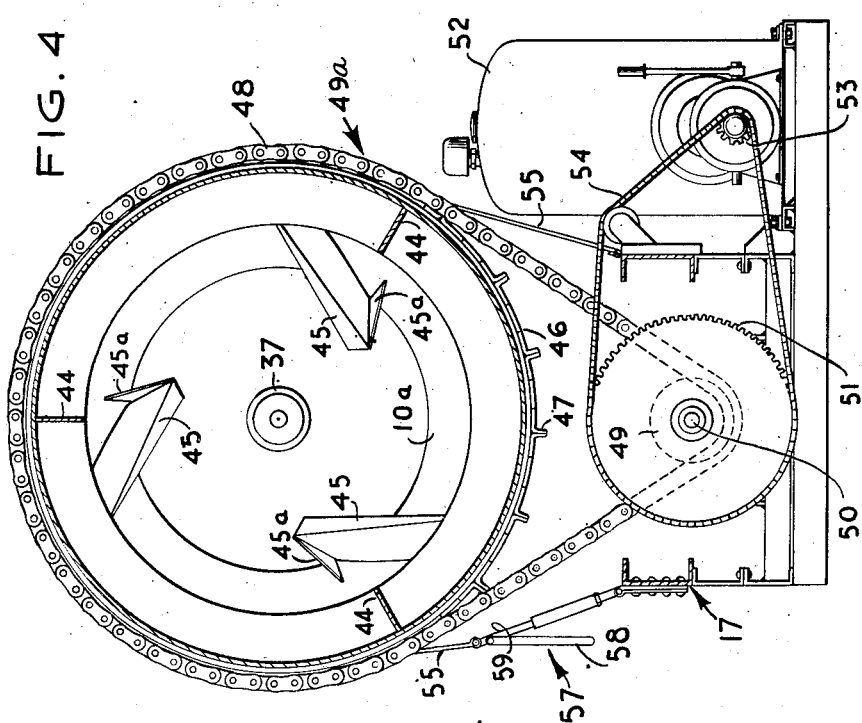
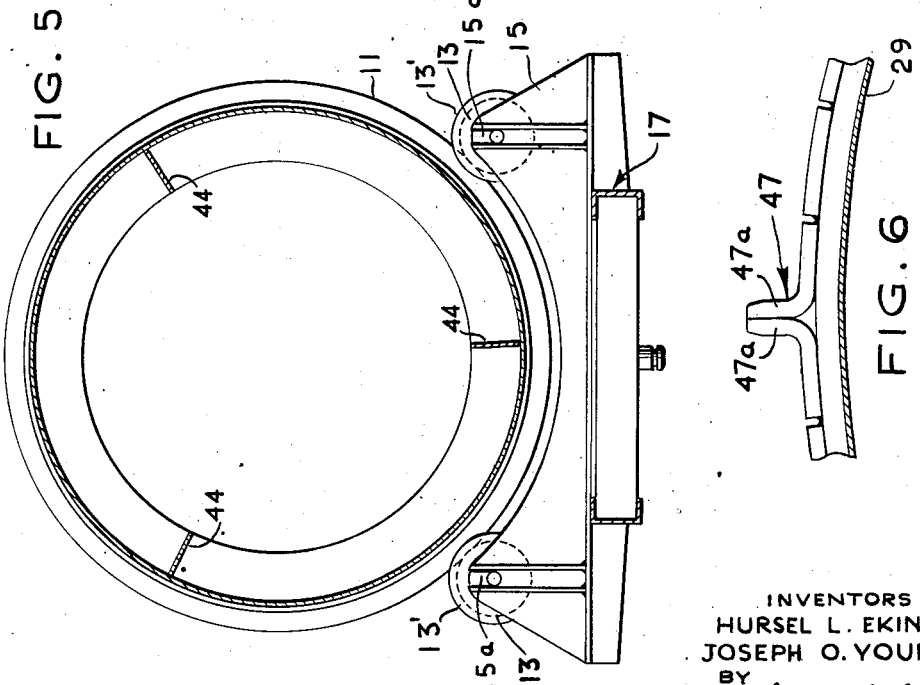
INVENTORS
HURSEL L. EKIN
JOSEPH O. YOUNG
BY
Toulmin & Toulmin
ATTORNEYS Patented Mar. 2, 1948

2,436,959

UNITED STATES PATENT OFFICE 2,436,959

VEHICLE TRANSPORTING MEANS

Hursel L. Ekin, Galion, and Joseph O. Young, Rocky River, Ohio, assignors to The Galion Metallic Vault Company, Galion, Ohio, a corporation of Ohio Application June 17, 1946, Serial No. 677,378

3 Claims. (Cl. 214—83.32)

This invention relates to transportation means, and more particularly, to means for transporting gravel, sand, cement and other material of similar constitution.

It is an object of this invention to provide a container for transporting pourable material such as cement which can easily be filled and unloaded wherever desired.

It is another object of this invention to provide a container for transporting pourable material which is so constructed as to allow its transportation on trailers, railroad cars, and similar vehicles.

A further object of the invention consists in the provision of a tank-like container for transporting pourable material such as cement, which is provided with separate loading and unloading openings and which has means associated therewith for conveying the material to be unloaded to and unloading it from one end of said container.

These and other objects and advantages of the invention will appear more clearly from the following specification in connection with the accompanying drawings in which:

Figure 1 is a side elevational view of a container constructed according to the invention and mounted on a trailer;

Figure 2 is a top view of the container illustrated in Figure 1;

Figure 3 is a section along the line 3—3 of Figure 2;

Figure 4 is a section along the line 4—4 of Figure 1;

Figure 5 is a section along the line 5—5 of Figure 1;

Figure 6 shows a detail of the gear provided on the outside of the container;

Figure 7 illustrates the end of a scraper blade provided on the inside of the container.

Referring now to the drawings in detail, the structure shown therein comprises a tank-like container generally designated 10 having bearing surfaces 11 and 12 thereon. The bearing surfaces 11 and 12 are engaged by a pair of rollers 13 and 14 which are carried by supports 15 and 16 and are mounted in slots 15a provided in the support 15. The supports 15 and 16 are mounted on a trailer generally designated 17 which may be of any conventional design. In order to prevent the container 10 from moving in the direction of its longitudinal axis, the rollers 13 and 14 are provided with flanges 13' and 14' engaging one side of the annular portions forming the bearing surfaces 11 and 12 respectively.

The container 10 is furthermore provided with three inlets 18, 19 and 20 through which the material to be transported may be poured into the container 10. The inlets 18, 19 and 20 are closed by lids 21, 22 and 23 respectively. The construction of the closing lids will best appear from Figure 3. As will be seen therefrom, the handle 23a has pinned thereto a pin 24 which in its turn is pinned to a plate 25. The plate 25 is connected with a plurality of tongues 26 adapted to engage correspondingly shaped slots 27, while also passing underneath a flange 28 connected with the container wall 29. The slots 27 are formed in elements connected to the lid 23 which is provided with a gasket 30. It will thus be clear that when the handle 23a is rotated by a predetermined angle the tongues 26 will slide underneath the flange 28 and will pull the lid 23 downwardly so as to cause the latter properly to close the inlet 20.

The container 10 is conically shaped at one end thereof as illustrated in Figure 3. This end forms the discharge opening 31 adapted to be closed by a closure 32. The closure 32 is provided with a gasket 33 and has a central opening 34 through which passes a threaded shaft 35. The thread 35a of the shaft 35 engages a correspondingly threaded nut 36 which is connected to the closure 32 in any convenient manner. In order to prevent the material to be transported from entering the thread 35a, a cap 37 surrounds the lower end of the thread 35a and is connected in any convenient manner to the closure 32. For similar reasons, the upper end of the thread 35a is surrounded by a bellows 38. Connected to the shaft 35 is a hand wheel 39 for operation of the shaft 35. In order to prevent the closure 32 from rotating when the hand wheel 39 is actuated, the closure 32 is provided with a guide 40 engaging a flange 41 connected to the container. The closure 32 as well as the shaft 35 is surrounded by a casing 42 having an opening 42a at the lower end thereof. This opening is the actual discharge opening and has associated therewith a chute 43. The casing 42 with the chute 43 is preferably supported by the trailer 17, so that, during rotation of the container 10, the casing 42 is held stationary without impeding the rotation of the discharge end of container 10 in said casing 42.

Mounted inside the container and connected to the container wall 29 in any convenient manner is a plurality of conveyor blades 44. The conveyor blades adjacent the cone shaped portion 10a of the container 10 have connected thereto ejector vanes as illustrated in Figure 7. These ejector vanes which are provided with reinforcing tabs 45a serve primarily the purpose of ejecting the material to be discharged from the container into the chute 43. In order to operate the blades 44, the container 10 is rotated. To this effect, the container 10 has mounted on the outside thereof a gear 46, the teeth 47 of which are preferably made of bent sections 47a as illustrated in Figure 6. The teeth 47 are engaged by links 48 of a chain 49a which also meshes with a pinion 49 rotatably mounted on the trailer 17. The pinion 49 is mounted on a shaft 50 which has keyed thereto a gear 51. The gear 51 is driven by a motor 52 of any desired type through a sprocket 53 and a chain 54. In this way the rotation of the container 10 may be effected independently of the prime mover operating the trailer 17. Thus, once the container 10 has been moved to the place where the material is to be unloaded, the prime mover may be disconnected from the trailer and may be used for other purposes.

In order to prevent jumping of the container while it is being transported, particularly over bumpy roads or the like, the trailer has connected thereto two holding bands generally designated at 55. Each band consists of the band proper 56 and a tensioning device 57. The tensioning device 57 includes a lever 58 which when moved upwardly actuates a link 59 in such a manner as to release the tension of the band 55. In this way the band 55 may be tightened prior to the transport of the container 10 so that the latter is firmly pressed upon its supporting rollers 13 and 14. However, when the container 10 is to be discharged and rotation of the container is required, the lever 58 is swung upwardly so that enough play will be provided between the band 55 and the container 10 to allow rotation of the latter by means of the motor 52.

It is of course understood that the present invention is by no means limited to the particular construction shown on the drawings, but also embraces any modifications within the scope of the appended claims.

Having thus fully set forth and described this invention, what is claimed as new and desired to be secured by United States Letters Patent is:

1. In combination, a container, inlet means distributed over the length of said container to allow filling of the latter, one end of said container being cone shaped and comprising outlet means for discharging the material from said container, chute means adjacent said outlet means, closure means operable selectively for opening and closing said outlet means, conveying blades connected to the inside of said container and operable to convey material to said outlet means, supporting means for rotatably supporting said container and rotating means associated with said container for rotating the latter to thereby actuate said conveying blades, said rotating means including sprocket means, a chain passing over said sprocket means, and gear segments engaged by said chain and mounted on the outside of said container.

2. In combination, a container, spaced inlet and outlet means associated with said container for respectively filling and unloading said container, conveying blades connected to the inside of said container and operable to convey material to said outlet means, gear means connected to the outside of said container and composed of a plurality of bent gear sections, a prime mover comprising sprocket means, and chain means operatively interconnecting said sprocket means and said gear means to allow rotation of said container for operating said conveying blades.

3. In combination, a container, inlet and outlet means associated with said container for filling and unloading said container, conveying means arranged on the inside of said container and connected thereto for conveying material to said outlet means, one end of said container being provided with a cone-shaped portion having the walls thereof arranged so as to diverge toward the outside and defining said outlet means, outlet closure means arranged to fit into said cone-shaped portion and operable manually for selectively opening or closing said outlet means, housing means surrounding said cone-shaped portion and rigidly connected to said container, operating means supported by said housing means and operable for actuating said outlet closure means, ejector means arranged adjacent said outlet means and connected to the adjacent conveying means for ejecting the material from said cone shaped portion, spaced supporting means including roller means for rotatably supporting said container, and driving means for rotating said container to thereby actuate said conveying means.

HURSEL L. EKIN.
JOSEPH O. YOUNG.

REFERENCES CITED

The following references are of record in the file of this patent:

UNITED STATES PATENTS

| Number | Name | Date |
|---|---|---|
| 1,739,183 | Schuberth | Dec. 10, 1929 |
| 1,784,371 | Marks et al. | Dec. 9, 1930 |
| 1,885,350 | Hoffmann | Nov. 1, 1932 |
| 1,942,277 | Davis et al. | Jan. 2, 1934 |
| 1,948,715 | Jaeger et al. | Feb. 27, 1934 |
| 1,991,297 | Schulter | Feb. 12, 1935 |